(12) United States Patent
Iyoda et al.

(10) Patent No.: US 8,247,048 B2
(45) Date of Patent: Aug. 21, 2012

(54) CYLINDRICAL MOLDED ARTICLE, INJECTION MOLD AND MANUFACTURING METHOD OF CYLINDRICAL MOLDED ARTICLE

(75) Inventors: Makoto Iyoda, Osaka (JP); Suguru Nakao, Hyogo (JP); Shouichi Irie, Osaka (JP)

(73) Assignee: Panasonic Corporation, Osaka (JP)

( * ) Notice: Subject to any disclaimer, the term of this patent is extended or adjusted under 35 U.S.C. 154(b) by 1178 days.

(21) Appl. No.: 12/059,896

(22) Filed: Mar. 31, 2008

(65) Prior Publication Data

US 2009/0035495 A1 Feb. 5, 2009

(30) Foreign Application Priority Data

Aug. 3, 2007 (JP) .................. 2007-203427

(51) Int. Cl.
*B29D 22/00* (2006.01)
*G02B 15/14* (2006.01)
*G03B 17/00* (2006.01)
*B22C 9/24* (2006.01)
*B29B 7/00* (2006.01)

(52) U.S. Cl. ............... 428/35.7; 428/34.1; 428/36.9; 359/700; 359/819; 359/820; 396/529; 249/49; 249/57; 249/59; 264/328.12; 264/328.8

(58) Field of Classification Search .......... 396/71, 396/72, 73, 74, 85, 529; 249/49, 57, 59; 428/34.1; 359/819

See application file for complete search history.

(56) References Cited

U.S. PATENT DOCUMENTS 6,304,794 B1 10/2001 Nishimine et al.

FOREIGN PATENT DOCUMENTS

| JP | 2955509 | | 10/1997 |
|---|---|---|---|
| JP | 2002-036309 A | | 2/2002 |
| JP | 2002036309 A | * | 2/2002 |
| JP | 2002-370268 | | 12/2002 |
| JP | 2002-370268 A | | 12/2002 |
| JP | 2002370268 A | * | 12/2002 |
| JP | 2005-049534 | | 4/2004 |
| JP | 3523249 | | 4/2004 |
| JP | 2004-148525 | | 5/2004 |
| JP | 2006-322985 | | 11/2006 |

OTHER PUBLICATIONS

Japanese Notice of Reasons for Rejection issued in Japanese Patent Application No. JP 2007-203427 dated Dec. 15, 2009.

* cited by examiner

*Primary Examiner* — Rena Dye
*Assistant Examiner* — Lee Sanderson
(74) *Attorney, Agent, or Firm* — McDermott Will & Emery LLP (57) ABSTRACT

An injection mold 70 includes a first portion 71, a second portion 72, a third portion 73, and a fourth portion 79. The first portion 71 has three high-density regions H in which there is the highest proportion of the axial direction dimension accounted for by the portion corresponding to cam grooves with respect to the axial direction dimension of a cavity 71a. First gates 74b are disposed at locations corresponding to the high-density regions H, or closer to the high-density regions H than second gates 75b. The average channel sectional area of first runners 74a is larger than the average channel sectional area of second runners 75a.

1 Claim, 7 Drawing Sheets

CYLINDRICAL MOLDED ARTICLE, INJECTION MOLD AND MANUFACTURING METHOD OF CYLINDRICAL MOLDED ARTICLE

CROSS-REFERENCE TO RELATED APPLICATIONS

This application claims priority to Japanese Patent Application No. JP2007-203427 filed on Aug. 3, 2007. The entire disclosures of Japanese Patent Application No. JP2007-203427 is hereby incorporated herein by reference.

BACKGROUND OF THE INVENTION

1. Field of the Invention

The present invention relates to a cylindrical molded article, the injection mold, and the manufacturing method of the cylindrical molded article, and in particular, relates to a cylindrical molded article used in a lens barrel of a camera, the injection mold, and the manufacturing method of the cylindrical molded article.

2. Description of the Related Art

One conventional type of lens barrel is a multistage retractable lens barrel. This kind of lens barrel is made up of a plurality of cylindrical members of different diameter. To convert the rotational motion of the cylindrical members into axial linear motion, three cam grooves and three cam pins that engage with these cam grooves are provided to a plurality of cylindrical members, for example.

It is generally difficult to machine cam grooves on the inner peripheral part of cylindrical members. Therefore, the cylindrical members that make up a lens barrel are formed by injection molding. An injection molding apparatus mainly includes an injection mold, and an injection apparatus for injecting the molten molding material into the mold. The injection apparatus can be adjusted for molding material injection pressure and injection speed.

The injection mold is provided with a cavity, a sprue, a plurality of runners, and a plurality of gates. The cavity is a hollow space used for form a molded article. The sprue is a channel through which flows the molding material injected from the injection apparatus. The runners guide the molding material from the sprue to the cavity. The gates are constrictions for preventing the back-flow of the molding material from the cavity to the runners, and are disposed between the runners and the cavity. In the case of a cylindrical molded article, a plurality of runners are disposed at a constant pitch in the circumferential direction so that the molding material will flow evenly. A plurality of gates are also disposed at a constant pitch in the circumferential direction.

Injection molding mainly includes a temperature adjustment step in which the temperature of the metal mold is adjusted, a filling step in which the mold is filled with the molding material, and a pressure-holding cooling step in which the molded article is cooled inside the mold. In the pressure-holding cooling step, the pressure is held at a specific level by the injection apparatus. This causes molding material to be supplied to portions where heat shrinkage has occurred, and minimizes deformation of the molded article due to heat shrinkage.

However, the wall thickness of the cylindrical molded article is uneven because of the cam grooves. Consequently, the thicker and thinner parts cool at different rates in the pressure-holding cooling step, so the heat shrinkage varies from place to place. As a result, there is a decrease in the circularity of the cylindrical molded article, and the cylindrical molded article cannot be obtained as designed. Even though the pressure is maintained in the pressure-holding cooling step, it may be impossible to suppress deformation of the molded article, depending on the shape of the cam grooves.

If the cylindrical molded articles that make up a lens barrel have decreased circularity, the cam grooves will be offset in the radial direction from the designed positioned. As a result, the lens group supported by the plurality of cylindrical molded articles becomes out of position, and this adversely affects the optical performance of the imaging optical system. Also, if the cam grooves become misaligned in the radial direction with respect to the designed position, there will be greater sliding resistance between the cam grooves and the cam pins, which hinders smooth zoom operation. As a result, greater drive force is necessary, and this increases power consumption.

In view of this, as disclosed in Japanese Patents 3,523,249 and 2,995,509, correction of the injection mold is generally carried out in conventional injection molding. More specifically, with a conventional metal mold design, deformation due to heat shrinkage is predicted on the basis of experimentation or simulation. The mold is produced in the shape of the molded article according to the predicted amount of deformation. Next, a prototype is formed using the mold thus produced. The dimensions of the various parts of the prototype are measured, and the differences between the design and measured values are calculated. Metal mold correction is performed using this dimensional error as an offset value. In the case of cylindrical molded articles used in a lens barrel, the cavity of the mold is formed as a cylindrical hollow space that is not a true circle.

If there is a large difference between the design and measured values, then more of the mold has to be machined, so mold correction takes more time. Also, if there is a large difference between the design and measured values, then there is greater dimensional change in the various parts of a prototype formed with the corrected mold than with a prototype formed with the initial mold. Consequently, it is unlikely that a molded article will be obtained with the design values after just one mold correction.

Conversely, if there is a small difference between the design and measured values in a prototype produced by the initial mold, mold machining takes less time and it is more likely that a cylindrical molded article will be obtained with the design values after a single mold correction.

As discussed above, it is preferable with an injection mold for the error from the design values of a molded article to be kept as small as possible.

On the other hand, there is a need in the field of digital cameras for the main body to be as compact as possible to make the product more portable. More specifically, there is a need to reduce the size of the lens barrel, which is considered to be a major factor in obtaining a smaller overall size. One way to make a lens barrel smaller is to increase the change ratio of the focal distance in zooming. As this is done, the shape of the cam grooves becomes more complicated, and the difference in the wall thickness of the cylindrical molded articles increases. Consequently, reducing the size of a lens barrel leads to a decrease in dimensional precision in cylindrical molded articles.

However, with the prior art discussed above, all that was proposed was a method for measuring dimensional error, or a method for predicting dimensional error by simulation and factoring this error into the metal mold design.

When a cylindrical molded article having a cam groove is injection molded, there seems to be some kind of relationship between the circularity and shape of the cam groove, but the details of this relationship are not yet clear. Therefore, with a conventional injection mold, even if changes are made to the shape of the cam grooves, there is the risk that more mold corrections will be necessary.

SUMMARY OF THE INVENTION

It is an object of the present invention to provide a cylindrical molded article, an injection mold, and a manufacturing method of the cylindrical molded article, with which manufacturing cost can be reduced and dimensional precision can be increased.

An injection mold according to a first aspect of the present invention is a mold for injection molding a cylindrical molded article having at least three cam grooves. This injection mold includes a first portion, a second portion, a third portion, and a fourth portion. The first portion has a cavity arranged to mold the cylindrical molded article. The second portion has a sprue as a channel through which the molding material is injected. The third portion has three first runners connected to the sprue, and three second runners connected to the sprue. The fourth portion has three first gates connecting the cavity and the first runners, and three second gates connecting the cavity and the second runners having the same channel length as the first runners. The first portion has three high-density regions in which there is the highest proportion of the axial direction dimension accounted for by the portion corresponding to the cam grooves with respect to the axial direction dimension of the cavity. The first gates are disposed at a location corresponding to the high-density regions, or closer to the high-density regions than the second gates. The average channel sectional area of the first runners is larger than the average channel sectional area of the second runners.

Here, the average channel sectional area is defined as the averaged value of the sectional areas in each position from the entrance to the exit of the runners, and can also be defined as the volume of the channel of the runners divided by the length of the channel.

With this injection mold, since the average channel sectional area of the first runners is set to be larger than the average channel sectional area of the second runners, the pressure loss of the molding material which flows through the first runners is small compared to the second runners, and the filling pressure of the first runners is high compared to the filling pressure of the second runners.

Furthermore, since the first gates to which the first runners are connected are disposed at a location corresponding to the high-density regions, or closer to the high-density regions than the second gates, filling pressure in areas around the high-density regions can be increased to be higher than ever before, during injection molding. As a result, in the pressure-holding cooling step, the deformation of the molded article due to heat shrinkage tends to be suppressed more than ever before. In other words, with this injection mold, the number of mold corrections can be reduced, and dimensional precision can be increased while the manufacturing cost is reduced.

An injection mold according to a second aspect of the present invention is the mold of the first aspect, wherein the three first runners are disposed at a constant pitch in the circumferential direction. The three second runners are disposed at a constant pitch in the circumferential direction.

An injection mold according to a third aspect of the present invention is the mold of the second aspect, wherein the first and second runners are alternately disposed at a constant pitch in the circumferential direction.

Here, the term "a constant pitch" also includes the case in which the first and the second runners are out of alignment in the circumferential direction within the range allowed by the amount of deformation of the molded article, other than the case in which the first and the second runners are completely at a constant pitch.

An injection mold according to a fourth aspect of the present invention is the mold of the third aspect, wherein the first portion has three low-density regions in which there is the lowest proportion of axial direction dimension accounted for by the portion corresponding to the cam grooves with respect to the axial direction dimension of the cavity. The second gates are disposed at a position corresponding to the low-density regions, or closer to the low-density regions than the first gates.

A manufacturing method according to a fifth aspect of the present invention includes molding a cylindrical molded article using the injection mold of any one of the first through fourth aspects.

A cylindrical molded article according to a sixth aspect of the present invention is molded by injection molding. This cylindrical molded article includes a cylindrical portion, at least three cam grooves, three first gate portions, and three second gate portions. The cam grooves are formed on either the inner peripheral surface or the outer peripheral surface of the cylindrical portion. The first gate portions are formed at an end of the cylindrical portion, and are vestiges of gates in injection molding. The second gate portions are formed at an end of the cylindrical portion, and are vestiges of gates in injection molding. The first and second gate portions are alternately disposed in the circumferential direction. The residual stress in areas around the first gate portions is greater than the residual stress in areas around the second gate portions.

The residual stress of the cylindrical molded article can be measured by the photoelasticity method. The photoelasticity method is a method for measuring the principal stress difference using the birefringence of a polymer material.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

The lens barrel and camera according to the present invention will now be described with reference to the drawings.

1. Overview of Digital Camera

Figure 1:
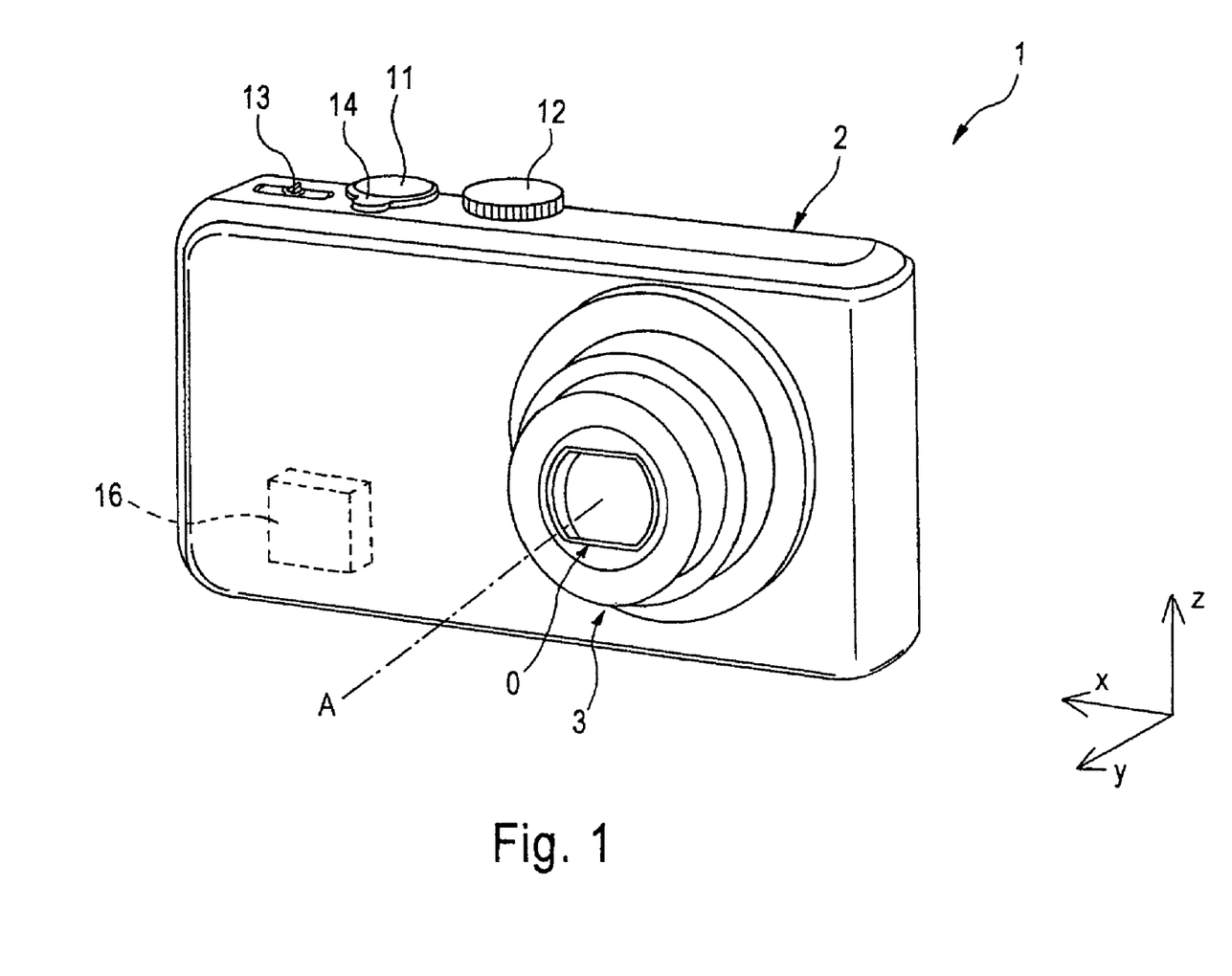
FIG. 1 is a schematic perspective view of a digital camera.
Figure 2:
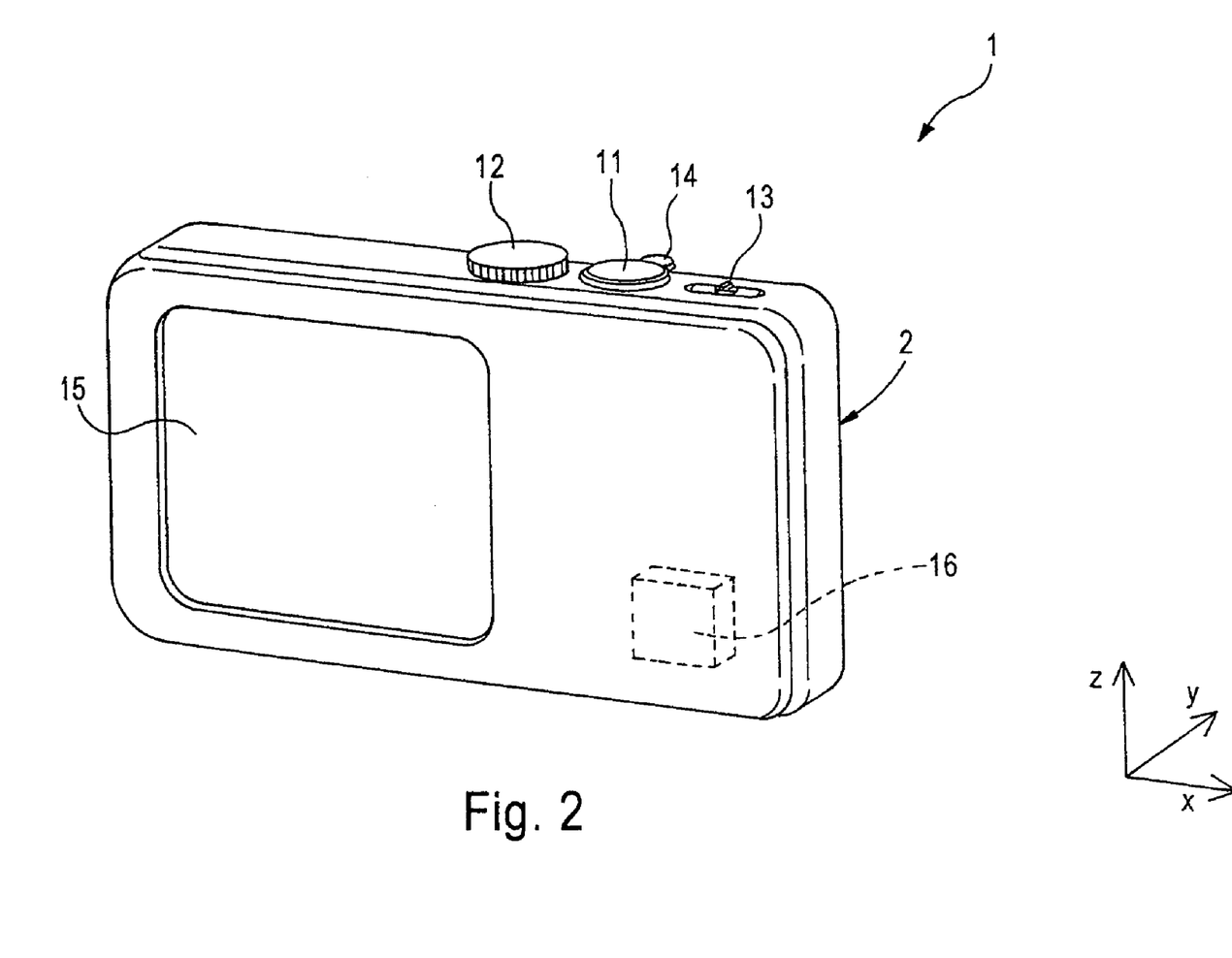
FIG. 2 is a schematic perspective view of a digital camera.

A digital camera 1 according to a preferred embodiment of the present invention will be described with reference to FIGS. 1 and 2. FIGS. 1 and 2 are schematic perspective views of the digital camera 1. FIG. 1 shows the situation when a lens barrel 3 is in an image capture state.

The digital camera 1 is a camera for acquiring an image of a subject. A multistage retractable lens barrel 3 is installed in the digital camera 1 in order to afford higher magnification and a more compact size.

In the following description, the six sides of the digital camera 1 are defined as follows.

The side that faces the subject when an image is captured with the digital camera 1 is called the front face, and the opposite side is called the rear face. When an image is captured such that the top and bottom of the subject in the vertical direction coincide with the short-side top and bottom of a rectangular image (generally with an aspect ratio (the ratio of the long side to the short side) of 3:2, 4:3, 16:9, etc.) captured by the digital camera 1, the side of the camera facing upward (vertically) is called the top face, and the opposite side is called the bottom face. Further, when an image is captured such that the top and bottom of the subject in the vertical direction coincide with the short-side top and bottom of a rectangular image captured by the digital camera 1, the side of the camera that is to the left when viewed from the subject side is called the left face, and the opposite side is called the right face. The above definitions are not intended to limit the orientation in which the digital camera 1 is used.

According to the above definitions, FIG. 1 is a perspective view of the front, top, and left faces.

In addition to the six sides of the digital camera 1, the six sides of the various constituent members disposed in the digital camera 1 are similarly defined. That is, the above definitions apply to the six sides of the various constituent members when they have been disposed in the digital camera 1.

Also, as shown in FIG. 1, there is defined a three-dimensional coordinate system (right-hand system) having a Y axis that is parallel to the optical axis A of an imaging optical system O (discussed below). With this definition, the direction from the rear face side toward the front face side along the optical axis A is the Y axis positive direction, the direction from the right face side toward the left face side perpendicular to the optical axis A is the X axis positive direction, and the direction from the bottom face side toward the top face side perpendicular to the X and Y axes is the Z axis positive direction.

This XYZ coordinate system will be referred to in the following description of the drawings. That is, the X axis positive direction, the Y axis positive direction, and the Z axis positive direction in the drawings indicate the same respective directions.

2. Overall Structure of a Digital Camera

As shown in FIGS. 1 and 2, the digital camera 1 mainly includes an outer case 2 that holds the various units, an imaging optical system O that forms an optical image of the subject, and a lens barrel 3 that movably supports the imaging optical system O.

The imaging optical system O is made up of a plurality of lens groups, and these lens groups are disposed in a state of being aligned in the Y axis direction. The lens barrel 3 has a multistage retractable configuration, and is supported by the outer case 2. The plurality of lens groups are supported by the lens barrel 3 to be relatively movable in the Y axis direction. The configuration of the lens barrel 3 will be described in detail below.

A CCD unit 21 serving as an imaging unit that subjects optical images to photoelectric conversion, and an image storing unit 16 that stores the images acquired by the CCD unit 21 are built into the outer case 2. A liquid crystal monitor 15 for displaying the images acquired by the CCD unit 21 is provided to the rear face of the outer case 2.

A shutter release button 11, a control dial 12, a power switch 13, and a zoom adjustment lever 14 are provided to the top face of the outer case 2 so that the user can capture images and perform other such operations. The shutter release button 11 is a button for inputting the exposure timing. The control dial 12 is a dial for making various settings related to image capture. The power switch 13 is used to switch the digital camera 1 on and off. The zoom adjustment lever 14 is used to adjust the zoom magnification, and can rotate over a specific angle range around the shutter release button 11.

FIGS. 1 and 2 show only the main configuration of the digital camera 1, and therefore components other than those discussed above may be provided to the digital camera 1.

3. Configuration of Lens Barrel

Figure 3:
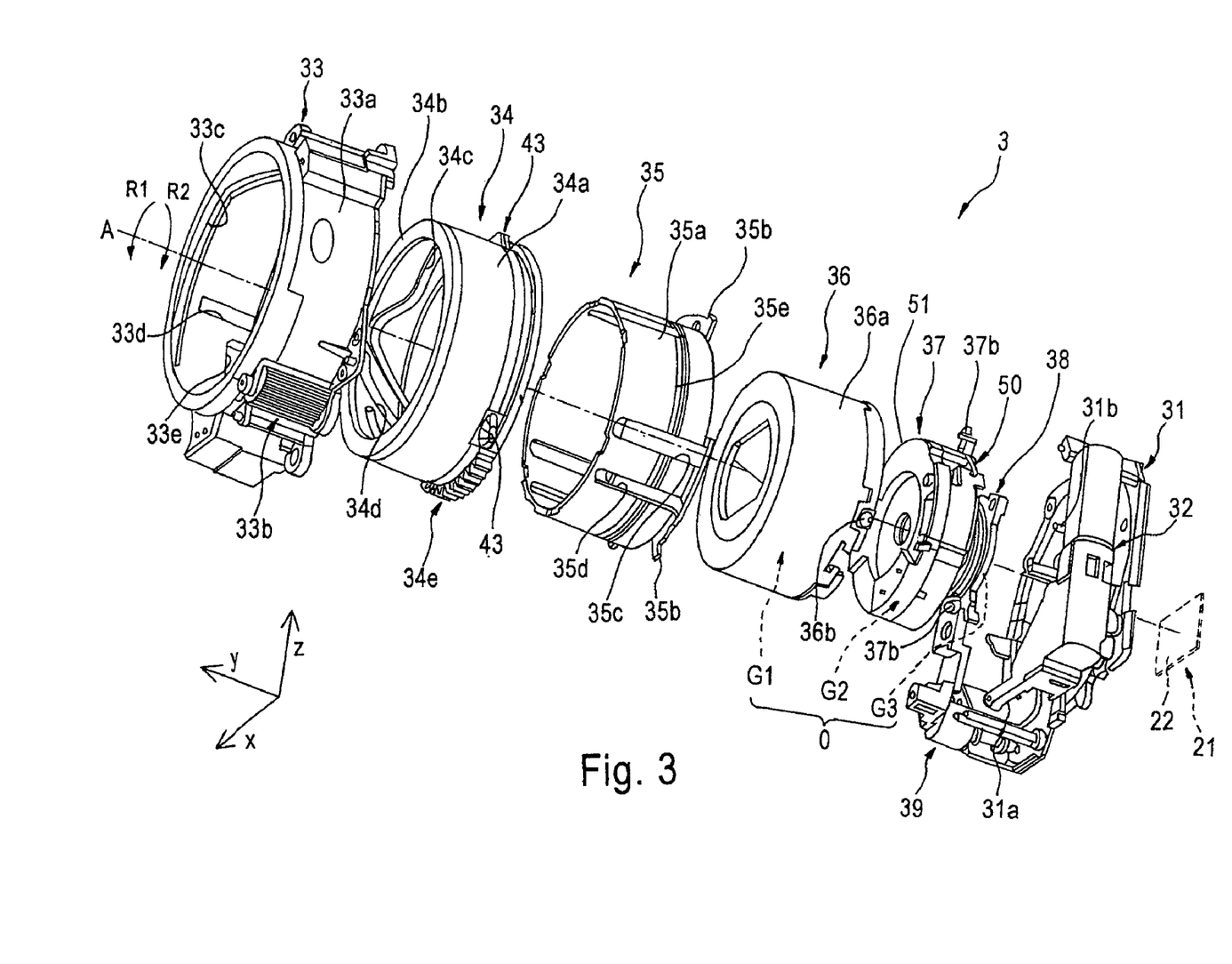
FIG. 3 is an exploded perspective view of a lens barrel.

The overall configuration of the lens barrel 3 will be described with reference to FIG. 3. FIG. 3 is an exploded perspective view of the lens barrel 3.

As shown in FIG. 3, the lens barrel 3 mainly includes a base plate 31 fixed to the outer case 2, a zoom motor 32 fixed to the base plate 31 and serving as a drive source, a stationary frame 33 that holds various frame members between itself and the base plate 31, a drive frame 34 to which the drive force of the zoom motor 32 is inputted, and a straight-movement frame 35 that is supported by the stationary frame 33 to be relatively movable in the Y axis direction. A CCD sensor 22 of the CCD unit 21 is attached to the base plate 31. An example of the zoom motor 32 is a stepping motor.

The lens barrel 3 further includes a first lens frame 36 that supports a first lens group G1, a second lens frame 37 that supports a second lens group G2, and a third lens frame 38 that supports a third lens group G3. The first lens group G1 is, for example, a lens group having negative power overall, and takes in light from the subject. The second lens group G2 is, for example, a lens group having positive power overall. The third lens group G3 is, for example, a lens group having positive power for adjusting the focal point. The imaging optical system O is made up of the first lens group G1, the second lens group G2, and the third lens group G3.

3.1. Stationary Frame

The stationary frame 33 is a member for guiding the drive frame 34, and makes up a member on the stationary side of the lens barrel 3 along with the base plate 31. The stationary frame 33 is fixed by screws to the base plate 31. The stationary frame 33 mainly includes a stationary frame main body 33a that makes up the main part, and a drive gear 33b that is rotatably supported by the stationary frame main body 33a.

The stationary frame main body 33a is fixed to the base plate 31, and the drive frame 34 is disposed inside the inner periphery thereof. The drive gear 33b is a member for transmitting the drive force of the zoom motor 32 to the drive frame 34, and meshes with a gear (not shown) of the zoom motor 32. Three cam grooves 33c for guiding the drive frame 34, and three straight-movement grooves 33d for guiding the straight-movement frame 35 are formed on the inner peripheral part of the stationary frame main body 33a. The cam grooves 33c are spaced equally in the circumferential direction. The straight-movement grooves 33d extend in the Y axis direction, and are spaced equally in the circumferential direction.

3.2. Drive Frame

The drive frame 34 is a member for guiding the first lens frame 36 and the second lens frame 37, and is disposed inside the inner periphery of the stationary frame 33. The drive frame 34 mainly includes a substantially cylindrical drive frame main body 34a that is disposed inside the inner periphery of the stationary frame main body 33a.

Three cam pins 43 are provided as cam members on the outer peripheral part of the drive frame main body 34a, and three first cam grooves 34c and three second cam grooves 34d are formed on the inner peripheral part. The first cam grooves 34c are grooves for guiding the first lens frame 36. The second cam grooves 34d are grooves for guiding the second lens frame 37. The three first cam grooves 34c are spaced equally in the circumferential direction. The three second cam grooves 34d are spaced equally in the circumferential direction. The three cam pins 43 are spaced equally in the circumferential direction, and engage with the three cam grooves 33c of the stationary frame 33. That is, the drive frame 34 is supported by the stationary frame 33 via the cam pins 43.

A gear portion 34e is formed on the outer peripheral part of the drive frame main body 34a. The gear portion 34e meshes with the drive gear 33b of the stationary frame 33. As a result, the drive force of the zoom motor 32 is transmitted through the drive gear 33b to the drive frame 34.

The drive frame 34 is driven around the optical axis A (the R1 direction and the R2 direction) by the drive force of the zoom motor 32. When the camera 1 changes from their retracted state to their image capture state, the drive frame 34 is driven to the R1 side by the zoom motor 32. As a result, the cam pins 43 move along the cam grooves 33c of the stationary frame 33, and the drive frame 34 moves to the Y axis direction positive side relative to the stationary frame 33. When the camera 1 changes from their image capture state to their retracted state, the drive frame 34 is driven to the R2 side by the zoom motor 32. As a result, the drive frame 34 moves to the Y axis direction negative side relative to the stationary frame 33.

Thus, the drive frame 34 is movable in the Y axis direction while rotating relative to the stationary frame 33, according to the shape of the cam grooves 33c.

3.3. Straight-Movement Frame

The straight-movement frame 35 is a member for preventing the rotation of the first lens frame 36 relative to the stationary frame 33, and is disposed inside the inner periphery of the drive frame 34. The straight-movement frame 35 mainly includes a cylindrical straight-movement frame main body 35a and three straight-movement pins 35b formed on the outer peripheral part of the straight-movement frame main body 35a.

The straight-movement pins 35b are disposed on the Y axis direction negative side of the straight-movement frame main body 35a so as not to interfere with the drive frame 34, and engage with the straight-movement grooves 33d in the stationary frame 33. That is, the straight-movement frame 35 is supported by the stationary frame 33 to be relatively straight movable in the Y axis direction.

A bayonet groove 35e is formed on the outer peripheral part of the straight-movement frame main body 35a. A bayonet tab 34f (not shown) formed on the inner peripheral part of the drive frame 34 engages with the bayonet groove 35e. This allows the straight-movement frame 35 to rotate relative to the drive frame 34 and to move integrally in the Y axis direction.

Specifically, when the drive frame 34 rotates relative to the stationary frame 33, the straight-movement frame 35 moves along with the drive frame 34 in the Y axis direction without rotating relative to the stationary frame 33 (while rotating relative to the drive frame 34).

Three first guide grooves 35c and three second guide grooves 35d that extend in the Y axis direction are formed in the straight-movement frame main body 35a. The three first guide grooves 35c are spaced equally in the circumferential direction, and the three second guide grooves 35d are spaced equally in the circumferential direction. Cam pins 36b (discussed below) of the first lens frame 36 are inserted in the first guide grooves 35c. Cam pins 37b (discussed below) of the second lens frame 37 are inserted in the second guide grooves 35d. That is, the rotation of the first lens frame 36 and the second lens frame 37 relative to the stationary frame 33 is restricted by the straight-movement frame 35. Furthermore, movement of the first lens frame 36 and the second lens frame 37 in the Y axis direction is not restricted by the first guide grooves 35c and the second guide grooves 35d.

3.4. First Lens Frame

The first lens frame 36 is a member supporting the first lens group G1 to be relatively movable in the Y axis direction, and is disposed inside the inner periphery of the straight-movement frame 35. The first lens frame 36 mainly includes a first lens frame main body 36a in the interior of which is held the first lens group G1, and the three cam pins 36b provided on the outer peripheral part of the first lens frame main body 36a. The cam pins 36b are passed through the first guide grooves 35c and engage with the first cam grooves 34c of the drive frame 34.

When the drive frame 34 rotates relative to the stationary frame 33, the cam pins 36b move along the first cam grooves 34c. The movement of the cam pins 36b in the rotary direction here is restricted by the first guide grooves 35c of the straight-movement frame 35. Therefore, the cam pins 36b move only in the Y axis direction along the first cam grooves 34c and the first guide grooves 35c. Thus, the first lens frame 36 is movable in the Y axis direction relative to the drive frame 34 according to the shape of the first cam grooves 34c, without rotating relative to the stationary frame 33.

3.5. Second Lens Frame

The second lens frame 37 is a member supporting the second lens group G2 to be relatively movable in the Y axis direction, and is disposed inside the inner periphery of the straight-movement frame 35 and on the Y axis direction negative side of the first lens frame 36. The second lens frame 37 mainly includes a first frame 50 and second frame 59 in the interior of which is held the second lens group G2, and the three cam pins 37b provided on the outer peripheral part of the first frame 50. The cam pins 37b are passed through the second guide grooves 35d and engage with the second cam grooves 34d of the drive frame 34.

When the drive frame 34 rotates relative to the stationary frame 33, the cam pins 37b move along the second guide grooves 35d. The movement of the cam pins 37b here in the rotational direction is restricted by the second guide grooves 35d of the straight-movement frame 35. Therefore, just as with the first lens frame 36, the cam pins 37b move only in the Y axis direction along the second cam grooves 34d and the second guide grooves 35d.

Thus, the second lens frame 37 is movable in the Y axis direction relative to the drive frame 34 according to the shape of the second cam grooves 34d, without rotating relative to the stationary frame 33.

3.6. Third Lens Frame

The third lens frame 38 is a member supporting the third lens group G3 to be relatively movable in the Y axis direction, and is supported by focus shafts 31a and 31b of the base plate 31 to be relatively movable in the Y axis direction. The third lens frame 38 is driven by a focus motor 39 fixed to the base plate 31. The focus motor 39 moves the third lens frame 38 in the Y axis direction relative to the base plate 31.

3.7. Summary

To summarize the above configuration, the first lens frame 36 and the second lens frame 37 can be moved in the direction along the optical axis A by the zoom motor 32 via the stationary frame 33, the drive frame 34, and the straight-movement frame 35. The third lens frame 38 can be moved in the direction along the optical axis A by the focus motor 39.

Therefore, this configuration results in a retractable lens barrel 3 that allows adjustment of the focus and the zoom magnification of the imaging optical system O.

4. Cylindrical Molded Article and Injection Mold

Figure 4A:
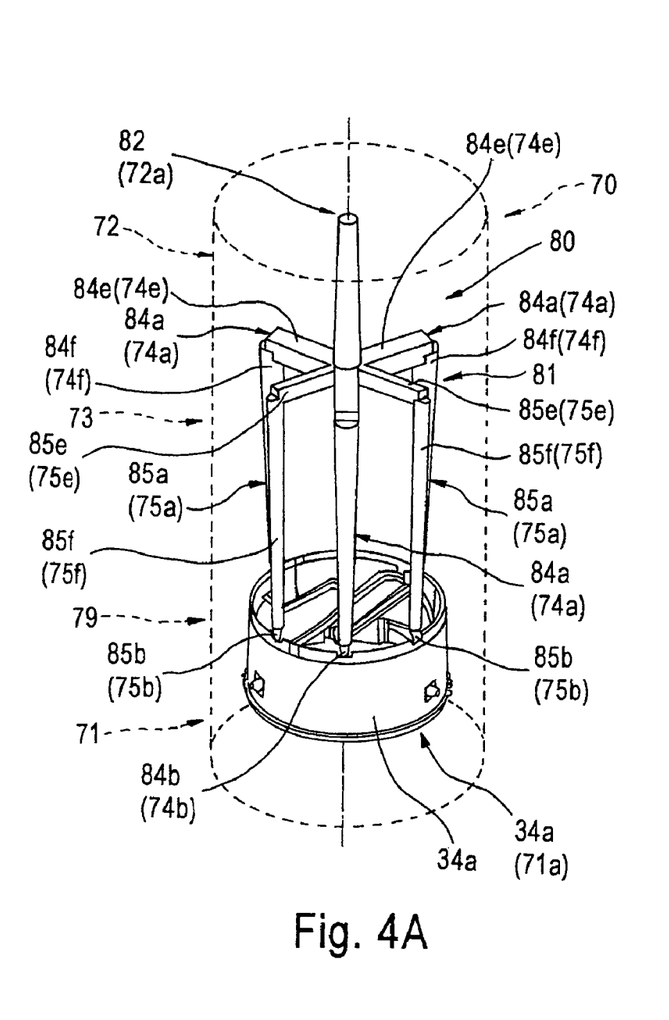
FIGS. 4A and 4B are schematic diagrams of a molded article and an injection mold.
Figure 4B:
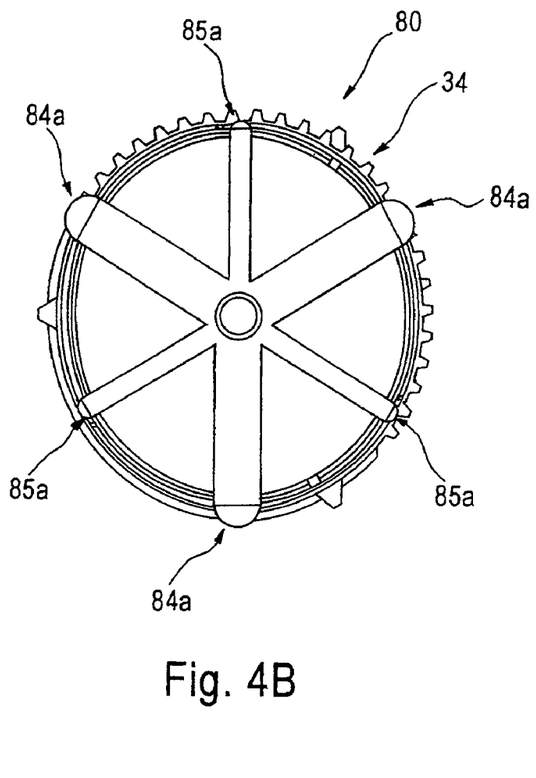

A cylindrical molded article and an injection mold according to this embodiment will be described. Here, a drive frame 34 will be described as an example of a molded article. FIGS. 4A and 4B show schematic diagrams of a molded article 80 and an injection mold 70. FIG. 4A is a schematic perspective view of the molded article 80 and the injection mold 70, and FIG. 4B is a plan view of the molded article 80 when viewed from the axis direction.

4.1. Molded Article

As shown in FIGS. 4A and 4B, the molded article 80 is a plastic molded article taken out from the mold 70 after injection molding. Examples of the plastic include thermoplastic resins such as polycarbonate. The molded article 80 includes the drive frame 34 as the cylindrical molded article, and a channel portion 81. The channel portion 81 is separated from the drive frame 34 after the injection molding. As described previously, a total of six cam grooves (first cam grooves 34c, second cam grooves 34d) are formed on the inner periphery side of the drive frame 34.

The channel portion 81 is a portion formed by a channel inside the mold 70 during injection molding, and includes a sprue portion 82, three first runner portions 84a connected to the sprue portion 82, three first gate portions 84b, three second runner portions 85a connected to the sprue portion 82, and three second gate portions 85b. The first gate portions 84b and the second gate portions 85b are arranged on a circular end surface which faces the axis direction of the drive frame 34. The channel portion 81 includes six gate portions (first gate portions 84b and second gate portions 85b).

As shown in FIG. 4A, the three first gate portions 84b are arranged at a constant pitch in the circumferential direction, and the three second gate portions 85b are arranged at a constant pitch in the circumferential direction. In addition, the first gate portions 84b and the second gate portions 85b are arranged alternately at a constant pitch in the circumferential direction.

In addition, the three first runner portions 84a are arranged at a constant pitch in the circumferential direction. The three second runner portions 85a are arranged alternately at a constant pitch in the circumferential direction. The first runner portions 84a and the second runner portions 85a are arranged alternately at a constant pitch in the circumferential direction.

Here, "a constant pitch" also includes, for example, the case in which the first gate portions 84b and the second gate portions 85b are out of alignment in the circumferential direction within the range allowed by the amount of deformation of the molded article 80, other than the case in which the first gate portions 84b and the second gate portions 85b are arranged completely at a constant pitch. This is the same also for the first runner portions 84a and the second runner portions 85a. As it will be described later, although the second gate portions 85b are approximately the same size as the first gate portions 84b, the first runner portions 84a are thicker than the second runner portions 85a.

4.2. Injection Mold

The injection mold 70 is a mold used in injection molding, and includes a first portion 71, a second portion 72, a third portion 73, and a fourth portion 79. Although the mold 70 includes a plurality of components, it is divided into the first portion 71 to the fourth portion 79 with the meaning which the portions have different functions. And so, this is not for limiting each of the portions 71 to 73 and 79 into a portion which is formed by a different component.

A cavity 71a is formed on the first portion 71 for forming the drive frame 34. The cavity 71a is formed by combining two mold components (not shown in the figure), for example. The drive frame 34 is formed by the cavity 71a.

In the second portion 72, a sprue 72a through which the molten molding material is injected from an injection unit (not shown in the figure) is formed. For example, the sprue 72a is formed by a cylindrical sprue bush (not shown in the figure). The sprue portion 82 is molded by the sprue 72a.

Three first runners 74a and three second runners 75a connected to the sprue 72a are formed in the third portion 73. Three first gates 74b and three second gates 75b are formed in the fourth portion 79. One end of the first runners 74a is connected to the sprue 72a, and the other end is connected to the first gates 74b. One end of the second runners 75a is connected to the sprue 72a, and the other end is connected to the second gates 75b. The first runner portions 84a and the second runner portions 85a are molded by the first runners 74a and the second runners 75a, and the first gate portions 84b and the second gate portions 85b are molded by the first gates 74b and the second gates 75b.

The first runners 74a and the second runners 75a are set to have different dimensions so that a difference in the filling pressure during injection molding occurs. More specifically, the length of the channel of the first runners 74a is approximately the same as the length of the channel of the second runners 75a, but the average channel sectional area of the first runners 74a is set to be larger than the average channel sectional area of the second runners 75a. Here, the average channel sectional area is defined as the averaged value of the sectional areas in each position from the entrance to the exit of the runners, and can also be defined as the volume of the channel of the runners divided by the length of the channel. The channel sectional area of the first runners 74a is larger than the channel sectional area of the second runners 75a, in the case that comparison is made on the positions corresponding to the first runners 74a and the second runners 75a. It can be said that the channel volume of the first runners 74a is greater than the channel volume of the second runners 75a.

More specifically, as shown in FIG. 4B, the first runners 74a include first horizontal runners 74e and first vertical runners 74f. The second runners 75a include second horizontal runners 75e and second vertical runners 75f. In the molded article 80, the first runner portions 84a include first horizontal runner portions 84e and first vertical runner portions 84f. The second runner portions 85a include second horizontal runner portions 85e and second vertical runner portions 85f. The average channel sectional area of the first horizontal runners 74e is larger than the average channel sectional area of the second horizontal runners 75e. The average channel sectional area of the first vertical runners 74f is larger than the average channel sectional area of the second vertical runners 75e.

In this way, since the average channel sectional area of the first runners 74a is set to be larger than the average channel sectional area of the second runners 75a, the pressure loss of the molding material that flows through the first runners 74a is small compared to the second runners 75a, and the filling pressure of the first runners 74a is high compared to the filling pressure of the second runners 75a. By providing the filling pressure of the first runners 74a higher than the filling pressure of the second runners 75a, the filling pressure in each portion can be changed according to the state of density of the cam grooves, as it will be described later.

In addition, in this embodiment, although the first gates 74b and the second gates 75b are approximately the same size, the first gates 74b and the second gates 75b may be set to have different sizes in accordance with the first runners 74a and the second runners 75a.

4.3. Gate Portions

Figure 5:
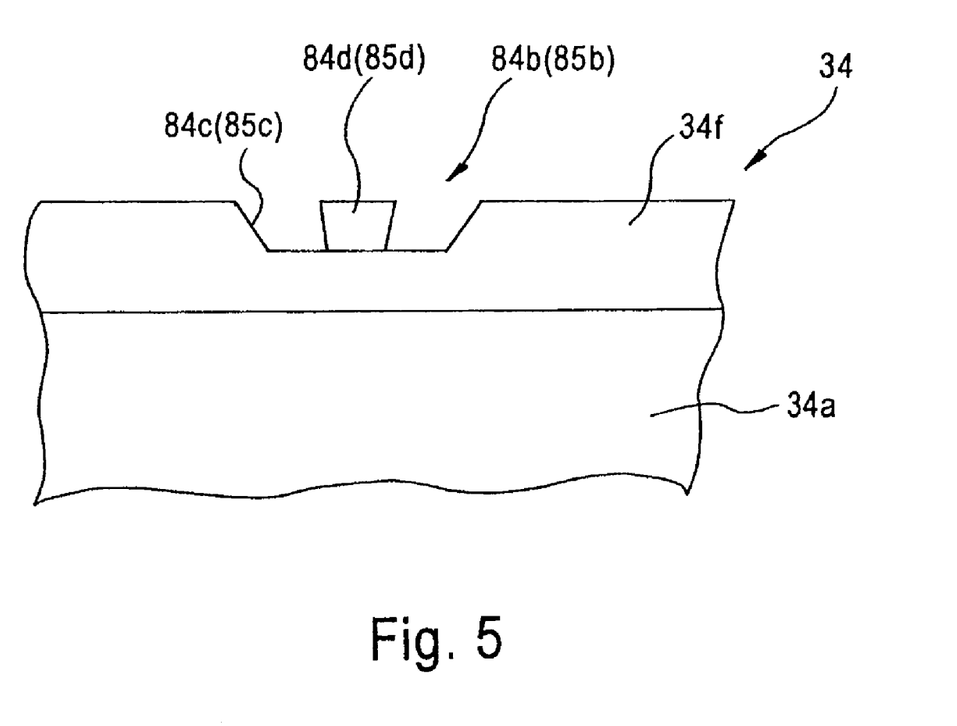
FIG. 5 is a detail view of the area around the gate portions.

The first gate portions 84b and the second gate portions 85b will be described using FIG. 5. FIG. 5 shows a detailed diagram of the area around the gate portions.

As shown in FIG. 5, the first gate portions 84b and the second gate portions 85b are vestiges of the first gates 74b and the second gates 75b during injection molding, and after the channel portion 81 is cut off, these are included in part of the drive frame 34. More specifically, an annular portion 34f whose walls are thinner than those of the drive frame main body 34a is formed at the end of the drive frame main body 34a on the Y axial direction positive side. Three first recesses 84c and three second recesses 85c are formed in the annular portion 34f. First protrusions 84d extend in the axial direction from the first recesses 84c. Second protrusions 85d extend in the axial direction from the second recesses 85c. The first protrusions 84d and the second protrusions 85d are held in the axial direction in the first recesses 84c and the second recesses 85c.

In addition, depending on how the channel portion 81 is cut off, the first protrusions 84d and second protrusions 85d may not remain. In this case, the first gate portions 84b are made up of the first recesses 84c, and the second gate portions 85b are made up of the second recesses 85c.

Furthermore, if the shape of the first gate portions 84b and the second gate portions 85b are the same, after the channel portion 81 is cut off from the drive frame 34, it will not be clear which gate portions correspond to the first runner portions 84a.

In this case, for example, by measuring the residual stress of the drive frame 34 through the photoelasticity method, these correspondence relationships can be understood from the drive frame 34. The photoelasticity method is a method for measuring the principal stress difference using the birefringence of a polymer material, and the residual stress of an injection molded article can be measured. Portions with high residual stress are portions in which the filling pressure is high during the pressure-holding cooling step, and portions with low residual stress are portions in which the filling pressure is low. In other words, portions with high residual stress are portions corresponding to the first runner portions 84a and the first gate portions 84b (first runners 74a and first gates 74b), and portions with low residual stress are portions corresponding to the second runner portions 85a and the second gate portions 85b (second runners 75a and second gates 75b).

In this way, by analyzing the drive frame 34 through the photoelasticity method, even if the first gate portions 84b and the second gate portions 85b have the same shape, which gate portions correspond to the first runner portions 84a can be identified. This is the same also in the case that the first gate portions 84b and the second gate portions 85b do not remain.

4.4. Runner Portions

Figure 6:
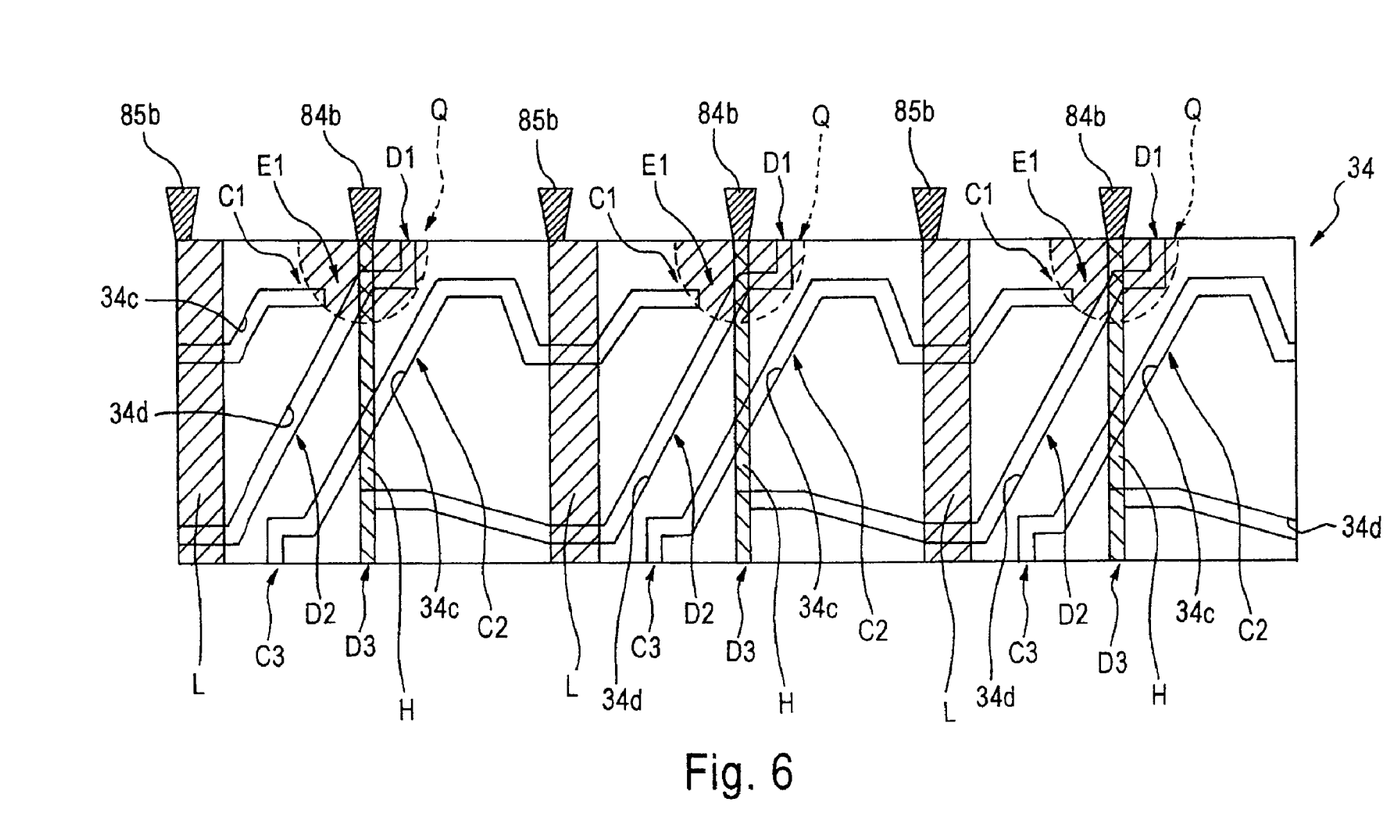
FIG. 6 is a development view of the inner peripheral side of a drive frame.

FIG. 6 shows a development view of the inner peripheral side of the drive frame 34. In addition, here, the disposition will be described using the constitution of the molded article 80, but since the constitution of the molded article 80 corresponds to the constitution of the mold 70, the following description can be considered to apply to the mold 70 as well, and not just to the molded article 80.

The three first cam grooves 34c and three second cam grooves 34d are formed on the inner peripheral side of the drive frame 34. The three first cam grooves 34c all have the same shape, and are disposed at a constant pitch in the circumferential direction. The three second cam grooves 34d all have the same shape, and are disposed at a constant pitch in the circumferential direction. The first cam grooves 34c and the second cam grooves 34d are alternately disposed in the circumferential direction so as not to cross each other.

The first cam grooves 34c each include a first cam groove main body C2 and a first conducting groove C3 formed at one end of the first cam groove main body C2. The first conducting groove C3 extends in the axial direction, and passes through the end of the drive frame main body 34a. The other end C1 of the first cam groove main body C2 does not pass through in the axial direction.

The second cam grooves 34d each include a second cam groove main body D2, a second conducting groove D1 formed at one end of the second cam groove main body D2, and a third conducting groove D3 formed at the other end of the second cam groove main body D2. The second conducting groove D1 and the third conducting groove D3 extend in the axial direction, and pass through the end of the drive frame main body 34a.

In this embodiment, the first cam grooves 34c have the same width from the end C1 to the first conducting groove C3. The second cam grooves 34d have the same width from the second conducting groove D1 to the third conducting groove D3. Also, the first cam grooves 34c and the second cam grooves 34d have the same width.

The drive frame 34 does not have a constant wall thickness because of the first cam grooves 34c and the second cam grooves 34d. More specifically, on the inner peripheral face of the drive frame 34, there are three high-density regions H in which the proportion accounted for by the cam grooves is high, and three low-density regions L in which the proportion accounted for by the cam grooves is the lowest. The three high-density regions H are disposed at a constant pitch in the circumferential direction. The three low-density regions L are disposed at a constant pitch in the circumferential direction.

The high-density regions H are regions in which there is the highest proportion of the axial direction dimension accounted for by the first cam grooves 34c and the second cam grooves 34d with respect to the axial direction dimension of the drive frame 34, on the inner peripheral face of the drive frame 34. The low-density regions L are regions in which there is the lowest proportion of the axial direction dimension accounted for by the first cam grooves 34c and the second cam grooves 34d with respect to the axial direction dimension of the drive frame 34, on the inner peripheral face of the drive frame 34. As shown in FIG. 6, the high-density regions H coincide with the portions in which the third conducting grooves D3 extend in the axial direction. The low-density regions L coincide with the portions in which the first cam grooves 34c and the second cam grooves 34d extend in the circumferential direction.

Figure 7:
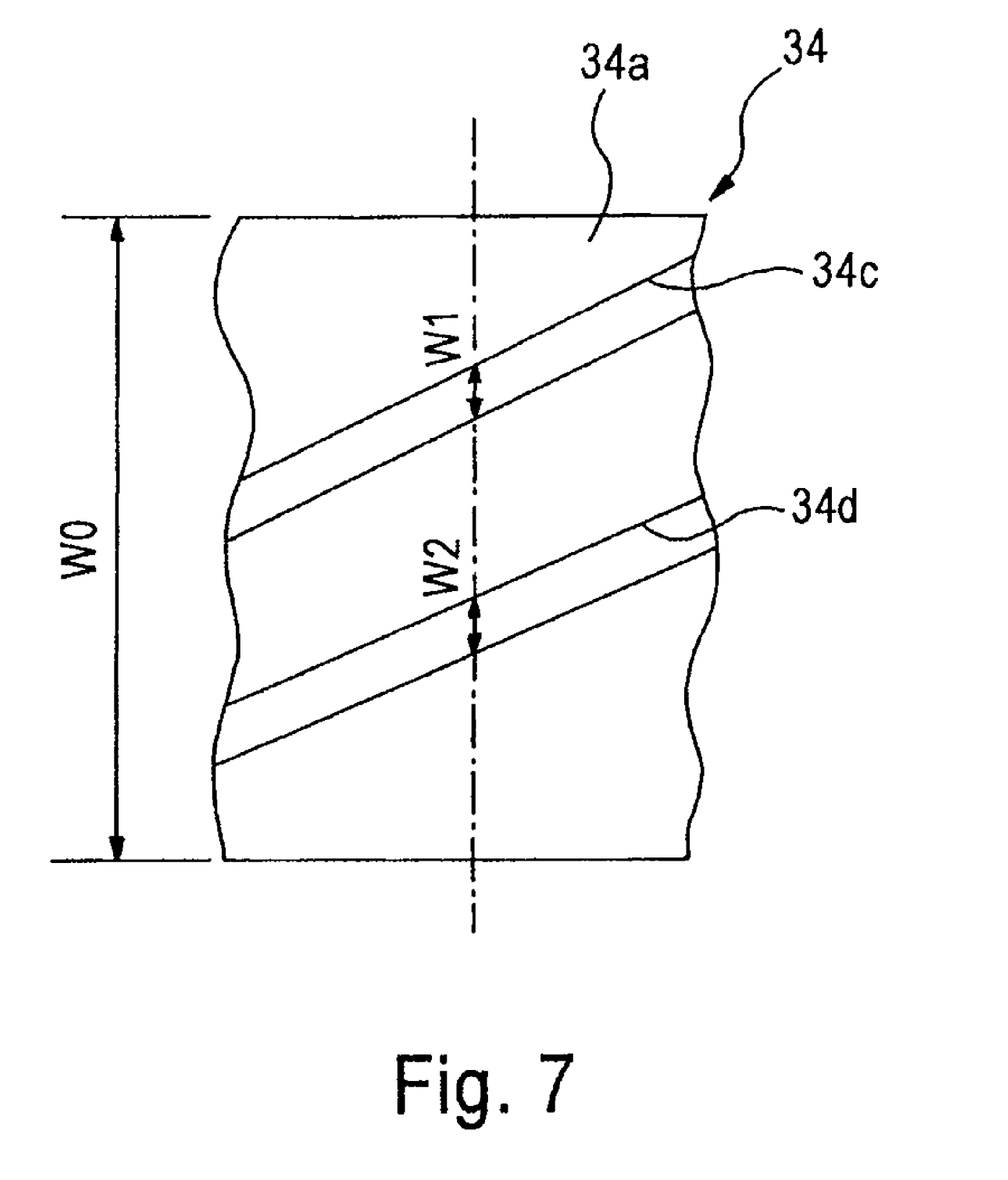
FIG. 7 is a schematic diagram of the method for determining the high-density regions and low-density regions.

The method for determining the high-density regions H and the low-density regions L will be described. As shown in FIG. 7, a case in which two grooves, a first cam groove 34c and a second cam groove 34d, are formed is assumed. W0 is defined as the axial direction dimension of the drive frame 34 (more specifically, the drive frame main body 34a), W1 is defined as the axial direction dimension of the first cam groove 34c, and W2 is defined as the axial direction dimension of the second cam groove 34d. In this case, P, which is "the proportion of the axial direction dimension accounted for by the first cam grooves 34c and the second cam grooves 34d with respect to the axial direction dimension of the drive frame 34", is expressed by $P=(W1+W2)/W0$. The clusters of lines where the proportion P is highest are the high-density regions H, and the clusters of lines where the proportion P is lowest are the low-density regions L.

4.5. Positional Relationship Between the Gate Portions and the Cam Grooves)

Here, the positional relationship between the gate portions and the cam grooves will be described in detail.

As shown in FIG. 6, the first gate portions 84b are disposed in positions corresponding to the high-density regions H (within the range of the high-density regions H in the circumferential direction), and the center of the first gate portions 84b in the circumferential direction basically coincides with the center of the high-density regions H in the circumferential direction. As a result, the filling pressure of the high-density regions H can be increased during injection molding. For example, as shown in FIG. 6, in the case that the residual stress of the drive frame 34 is analyzed through the photo-elasticity method described previously, the residual stress of regions Q around the first gate portions 84b is high compared to the residual stress of the surrounding regions thereof.

In addition, the second gate portions 85b are alternately disposed at a constant pitch in the circumferential direction with respect to the first gate portions 84b. The low-density regions L are disposed between the adjacent high-density regions H in the circumferential direction. The low-density regions L are disposed near the center, between the high-density regions H. Consequently, the second gate portions 85b are disposed basically on positions corresponding to the low-density regions L.

In the high-density regions H, since the first cam grooves 34c and the second cam grooves 34d are clustered the channel of the molding material becomes narrow, and the flow resistance becomes high during injection molding. Here, since the filling pressure around the high-density regions H is higher than that of the surrounding portions, it becomes easy for the molding material to flow into spaces corresponding to areas around the high-density regions H.

On the other hand, since the first cam grooves 34c and the second cam grooves 34d do not cluster in the low-density regions L, the channel of the molding material is comparatively wide, and it is easy for the material to flow during injection molding, compared to the high-density regions H. Here, since the filling pressure around the low-density regions L is lower than the filling pressure around the high-density regions H, the pressure can be suppressed from acting more than necessary in the low-density regions L.

In this way, by providing a difference in the average channel sectional areas of the first runners 74a and the second runners 75a, the filling pressure in areas around the high-density regions H can be increased to be higher than ever before, during injection molding. As a result, in the pressure-holding cooling step, it becomes easy to suppress the deformation (especially deformation in the radial direction) of the molded article 80 (more specifically, drive frame 34 serving as the cylindrical molded article) that is due to heat shrinkage more than ever before.

5. Operation of Digital Camera

The operation of the digital camera 1 will be described with reference to FIGS. 1 to 3.

5.1. When Power is Off

When the power switch 13 is in its off position, the lens barrel 3 is stopped in its retracted position (the state in which the lens barrel 3 is at its shortest in the Y axis direction), so that the lens barrel 3 will fit within the external dimensions of the outer case 2 in the Y axis direction.

5.2. When Power is on

When the power switch 13 is switched on, power is supplied to the various units, and the lens barrel 3 is driven from its retracted state to its image capture state. More specifically, the drive frame 34 is driven by the zoom motor 32 by a specific angle to the R1 side relative to the stationary frame 33. As a result, the drive frame 34 moves to the Y axis direction positive side relative to the stationary frame 33 while rotating relative to the stationary frame 33 according to the shape of the cam grooves 33c.

When the drive frame 34 rotates and moves straight relative to the stationary frame 33, the first lens frame 36 and the second lens frame 37 move along with the drive frame 34 to the Y axis direction positive side relative to the stationary frame 33. The first lens frame 36 and the second lens frame 37 do not rotate relative to the stationary frame 33 at this point.

The first lens frame 36 and the second lens frame 37 move along with the drive frame 34 to the Y axis direction positive side while moving in the Y axis direction relative to the drive frame 34 according to the shape of the first cam grooves 34c and the second cam grooves 34d. At this time the first lens frame 36 and the second lens frame 37 move relatively in the Y axis direction. Specifically, the first lens frame 36 and the second lens frame 37 move in the Y axis direction relative to the stationary frame 33 by an amount that is larger (or smaller) than the amount of movement of the drive frame 34 in the Y axis direction.

When the rotation of the drive frame 34 is stopped, movement of the first lens frame 36 and the second lens frame 37 in the Y axis direction also stops, and the lens barrel 3 is in its image capture state.

5.3. Zoom Operation During Image Capture

When the zoom adjustment lever 14 is operated to the telephoto side, the drive frame 34 is driven by the zoom motor 32 to the R1 side relative to the stationary frame 33, according to the rotational angle and operation duration of the zoom adjustment lever 14. As a result, the drive frame 34, the first lens frame 36, and the second lens frame 37 move together to the Y axis direction positive side relative to the stationary frame 33, and the zoom magnification of the imaging optical system O is increased.

When the zoom adjustment lever 14 is operated to the wide-angle side, the drive frame 34 is driven by the zoom motor 32 to the R2 side relative to the stationary frame 33, according to the rotational angle and operation duration of the zoom adjustment lever 14. As a result, the drive frame 34, the first lens frame 36, and the second lens frame 37 move together to the Y axis direction negative side relative to the stationary frame 33, and the zoom magnification of the imaging optical system O is decreased.

If heat shrinkage during injection molding causes the drive frame 34 to deform, a gap will be produced between the first cam grooves 34c and the cam pins 36b, or the first cam grooves 34c and the cam pins 36b will interfere with each other in the radial direction. Consequently, in the above-mentioned zoom operation, the position of the first lens frame 36 in the direction perpendicular to the optical axis A will become unstable, or the zoom drive of the first lens frame 36 will be hindered. The same applies to the second lens frame 37. Therefore, the dimensional precision of the drive frame 34 or other such cylindrical molded article is extremely important to the drive performance and optical performance of the lens barrel 3.

6. Characteristics

The following are characteristics of the molded article 80, the lens barrel 3, the digital camera 1, and the injection mold 70.

6.1.

With this injection mold 70, since the average channel sectional area of the first runners 74a is set to be larger than the average channel sectional area of the second runners 75a, the pressure loss of the molding material that flows through the first runners 74a is small compared to the second runners 75a, and the filling pressure of the first runners 74a is high compared to the filling pressure of the second runners 75a.

Furthermore, since the first gates 74b to which the first runners 74a are connected are arranged in positions corresponding to the high-density regions H, during injection molding, the filling pressure can be increased to be higher than ever before in areas around the high-density regions H. As a result, it becomes easy to suppress the deformation of the molded article 80 (more specifically, the drive frame 34 serving as the cylindrical molded article) due to the heat shrinkage in the pressure-holding cooling step than ever before. In other words, with this injection mold 70, the number of mold corrections can be reduced, and dimensional precision can be increased while the manufacturing cost is lowered.

6.2.

With this injection mold 70, since the first runners 74a and the second runners 75a are disposed alternately at a constant pitch in the circumferential direction, in the pressure-holding cooling step, the varying of the temperature distribution of the mold 70 in the circumferential direction can be suppressed, and the deformation of the molded article 80 due to heat shrinkage can be further suppressed.

6.3.

As described above, since the drive frame 34 or other such molded article 80 with increased dimensional precision is used in this lens barrel 3, the positional precision of the lens group is higher and the optical performance of the imaging optical system O improves. In addition, with this digital camera 1, since the optical performance of the imaging optical system O improves, the quality of an acquired image is improved.

7. Other Embodiments

The cylindrical molded article, the lens barrel, the camera, and the injection mold according to the present invention are not limited to those in the embodiment described above, and various modifications and alterations are possible within the range not departing from the scope of the present invention.

7.1

In the above described embodiment, the first gate portions 84b and the second gate portions 85b (first gates 74b and second gates 75b) are provided at a total of six places, but the number of gate portions (gates) is not limited to this, and the present invention can be applied to cases when there are more or fewer than six gate portion locations. The same applies to the runner portions (runners).

In addition, within the range in which the deformation of the molded article 80 can be suppressed, the first gate portions 84b and the second gate portions 85b (the first gates 74b and the second gates 75b) may be disposed at an irregular pitch in the circumferential direction. In addition, the same applies to the first runner portions 84a and the second runner portions 85a (first runners 74a and second runners 75a).

Furthermore, the shape of the first runners 74a and the second runners 75a is not limited to that in the embodiment described above. For example, the case in which the first horizontal runners 74e and the second horizontal runners 75e having the same average channel sectional area, and the first vertical runners 74f having a larger average channel sectional area than the second vertical runners 75e is also possible. In this case also, the average channel sectional area of the first runners 74a is larger than the average channel sectional area of the second runners 75a, and the same effect described above can be obtained.

7.2.

In the embodiment described above, although the cam grooves were formed on the inner peripheral side of the drive frame 34, the present invention can also be applied when the cam grooves are formed on the outer peripheral side, or when the cam grooves are formed on both the inner peripheral side and the outer peripheral side. In addition, the number, shape, disposition, and so forth of the cam grooves are not limited to the embodiment given above.

7.3.

In the above embodiment, although the gate portions were formed on the end face of the drive frame 34 in the axial direction, the disposition of the gate portions is not limited to this. For example, gate portions may be provided on the inner peripheral side or the outer peripheral side of the drive frame 34.

7.4.

In the above embodiment, the high-density regions H and the low-density regions L are regions having a certain surface area, but are not limited to this. For instance, the high-density regions H and the low-density regions L may instead be lines extending in the axial direction.

7.5.

The disposition of the first gate portions 84b and the second gate portions 85b is not limited to the embodiment described above. For example, the first gate portions 84b may be disposed in positions not corresponding to the high-density regions H (outside the range of the high-density regions H in the circumferential direction), if the disposition thereof is nearer to the high-density regions H than the second gate portions 85b.

7.6.

Conceivable devices in which the above-mentioned lens barrel 3 is installed include digital cameras which allow moving or still pictures to be captured, film cameras which make use of silver halide film, and so forth. In any case, the same effect as that in the embodiments given above can be obtained.

General Interpretation of Terms

In understanding the scope of the present invention, the term "configured" as used herein to describe a component, section or part of a device includes hardware and/or software that is constructed and/or programmed to carry out the desired function.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

Terms that are expressed as "means-plus function" in the claims should include any structure that can be utilized to carry out the function of that part of the present invention. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A cylindrical molded article formed by injection molding, comprising:
   a cylindrical portion;
   at least three cam grooves formed on either the inner peripheral surface or the outer peripheral surface of the cylindrical portion;
   three first gate portions formed at an end of the cylindrical portion as vestiges of gates in injection molding; and
   three second gate portions formed at an end of the cylindrical portion as vestiges of gates in injection molding, wherein:
   the first and second gate portions are alternately disposed in the circumferential direction,
   the first gate portions are disposed at a location corresponding to three high-density regions, respectively, in which there is the highest proportion of the axis direction dimension accounted for by the portion corresponding to the cam grooves with respect to the axial direction dimension of a cavity, or closer to the high-density regions than the second gate portions,
   the residual stress in areas around the first gate portions is greater than the residual stress in areas around the second gate portions, and
   the cylindrical portion has recesses depressed in an axial direction at a part where the first and second gate portions are formed.

\* \* \* \* \*